United States Patent
Bezbaruah et al.

(10) Patent No.: US 9,411,628 B2
(45) Date of Patent: Aug. 9, 2016

(54) VIRTUAL MACHINE CLUSTER BACKUP IN A MULTI-NODE ENVIRONMENT

(71) Applicant: Microsoft Technology Licensing, LLC, Redmond, WA (US)

(72) Inventors: Angshuman Bezbaruah, Redmond, WA (US); Lars Reuther, Kirkland, WA (US); Taylor O'Neil Brown, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/540,640

(22) Filed: Nov. 13, 2014

(65) Prior Publication Data

US 2016/0139943 A1 May 19, 2016

(51) Int. Cl.
*G06F 9/455* (2006.01)
*G06F 11/14* (2006.01)

(52) U.S. Cl.
CPC ........ *G06F 9/45558* (2013.01); *G06F 11/1446* (2013.01); *G06F 2009/45583* (2013.01); *G06F 2201/84* (2013.01)

(58) Field of Classification Search
CPC . G06F 9/45558; G06F 11/1446; G06F 11/48; G06F 9/45562
USPC .............................................. 718/1, 100–109
See application file for complete search history.

(56) References Cited

U.S. PATENT DOCUMENTS

| | | | |
|---|---|---|---|
| 7,577,959 B2 * | 8/2009 | Nguyen | G06F 9/45558 709/203 |
| 7,827,350 B1 | 11/2010 | Jiang et al. | |
| 7,890,689 B2 * | 2/2011 | Lam | G06F 9/44505 711/118 |
| 8,132,176 B2 * | 3/2012 | Bissett | G06F 9/468 718/1 |
| 8,219,769 B1 | 7/2012 | Wilk | |
| 8,296,419 B1 * | 10/2012 | Khanna | G06F 9/5072 709/201 |
| 8,326,803 B1 | 12/2012 | Stringham | |
| 8,387,048 B1 * | 2/2013 | Grechishkin | G06F 9/45533 718/1 |
| 8,516,210 B2 | 8/2013 | Buragohain | |

(Continued)

FOREIGN PATENT DOCUMENTS

WO  WO2007136883  11/2007

OTHER PUBLICATIONS

Nordal et al, "Streaming as a Hypervisor Service", ACM, pp. 33-40, 2013.*

(Continued)

*Primary Examiner* — Anil Khatri
(74) *Attorney, Agent, or Firm* — John Jardine; Raghu Chinagudabha; Micky Minhas

(57) ABSTRACT

Embodiments are directed to backing up a virtual machine cluster and to determining virtual machine node ownership prior to backing up a virtual machine cluster. In one scenario, a computer system determines which virtual machines nodes are part of the virtual machine cluster, determines which shared storage resources are part of the virtual machine cluster and determines which virtual machine nodes own the shared storage resources. The computer system then indicates to the virtual machine node owners that at least one specified application is to be quiesced over the nodes of the virtual machine cluster, such that a consistent, cluster-wide checkpoint can be created. The computer system further creates a cluster-wide checkpoint which includes a checkpoint for each virtual machine in the virtual machine cluster.

19 Claims, 5 Drawing Sheets

(56) References Cited

U.S. PATENT DOCUMENTS

| | | | | |
|---|---|---|---|---|
| 8,544,004 | B2* | 9/2013 | Fultheim | G06F 9/45533 718/1 |
| 8,601,473 | B1* | 12/2013 | Aron | G06F 9/45533 709/223 |
| 8,631,403 | B2* | 1/2014 | Soundararajan | G06F 9/5077 718/1 |
| 8,707,323 | B2* | 4/2014 | Galchev | G06F 9/505 718/105 |
| 8,881,146 | B2* | 11/2014 | Padmanabhuni | G06F 9/45558 711/173 |
| 8,924,967 | B2* | 12/2014 | Nelson | G06F 9/45533 709/224 |
| 8,924,969 | B2* | 12/2014 | Khutornenko | G06F 9/45533 718/1 |
| 8,959,511 | B2* | 2/2015 | Sinha | G06F 9/45558 718/1 |
| 8,984,508 | B2* | 3/2015 | Shu | G06F 9/45558 718/1 |
| 9,015,716 | B2* | 4/2015 | Fletcher | G06F 9/45533 715/736 |
| 2010/0011178 | A1 | 1/2010 | Feathergill | |
| 2013/0204948 | A1 | 8/2013 | Zeyliger et al. | |

OTHER PUBLICATIONS

Kontoudis et al, "Modeling and Managing Virtual Network Environments", ACM, pp. 39-46, 2013.*

Soror et al, "Automatic Virtual Machine Configuration for Database Workloads", ACM Transactions on Database Systems, vol. 35, No. 1, Article 7, pp. 1-47, 2010.*

Park et al, "Fast and Space-Efficient Virtual Machine Checkpointing", ACM, pp. 75-85, 2011.*

Steinmetz et al, "Cloud Computing Performance Benchmarking and Virtual Machine Launch Time", ACM, pp. 89-90, 2012.*

Hou et al, "Tradeoffs in Compressing Virtual Machine Checkpoints", ACM, pp. 41-48, 2013.*

Park et al, "Locality-Aware Dynamic VM Reconfiguration on MapReduce Clouds", ACM, pp. 1-10, 2012.*

Chen et al,"Communication-Driven Scheduling for Virtual Clusters in Cloud", ACM, pp. 125-128, 2014.*

"International Search Report & Written Opinion issued in PCT Application No. PCT/US2015/059819", Mailed Date: Feb. 19, 2016, 19 pages.

* cited by examiner

VIRTUAL MACHINE CLUSTER BACKUP IN A MULTI-NODE ENVIRONMENT

BACKGROUND

Computing systems have become ubiquitous, ranging from small embedded devices to phones and tablets to PCs and backend servers. Each of these computing systems is designed to process software code. The software allows users to perform functions, interacting with the hardware provided by the computing system. In some cases, these computing systems allow users to establish and run virtual machines. These virtual machines may provide functionality not provided by the host operating system, or may comprise a different operating system altogether. In this manner, virtual machines may be used to extend the functionality of the computing system.

BRIEF SUMMARY

Embodiments described herein are directed to backing up a virtual machine cluster and to determining virtual machine node ownership prior to backing up a virtual machine cluster. In one embodiment, a computer system determines which virtual machines nodes are part of the virtual machine cluster, determines which shared storage resources are part of the virtual machine cluster and determines which virtual machine nodes own the shared storage resources. The computer system then indicates to the virtual machine node owners that at least one specified application is to be quiesced over the nodes of the virtual machine cluster, such that a consistent, cluster-wide checkpoint can be created. The computer system further creates a cluster-wide checkpoint which includes a checkpoint for each virtual machine in the virtual machine cluster. Creating a consistent, cluster-wide checkpoint reduces storage requirements within this system as it avoids backing up each virtual machine separately. Moreover, as each virtual machine is not separately backed up, processing resources for each of those backups are saved, allowing these resources to be used elsewhere and increase the processing speed of other projects.

In another embodiment, a computer system performs a method for determining virtual machine node ownership prior to backing up a virtual machine cluster. The computer system determines that ownership has changed for at least one shared storage resource within a virtual machine cluster and identifies at least one potential new owner of the shared storage resource. The computer system determines which virtual machine nodes own the shared storage resources and indicates to the virtual machine node owners that at least one specified application is to be quiesced over the nodes of the virtual machine cluster, so that a consistent, cluster-wide checkpoint can be created. The computer system then creates the cluster-wide virtual machine checkpoint which includes checkpoints for each shared storage device in the virtual machine cluster.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
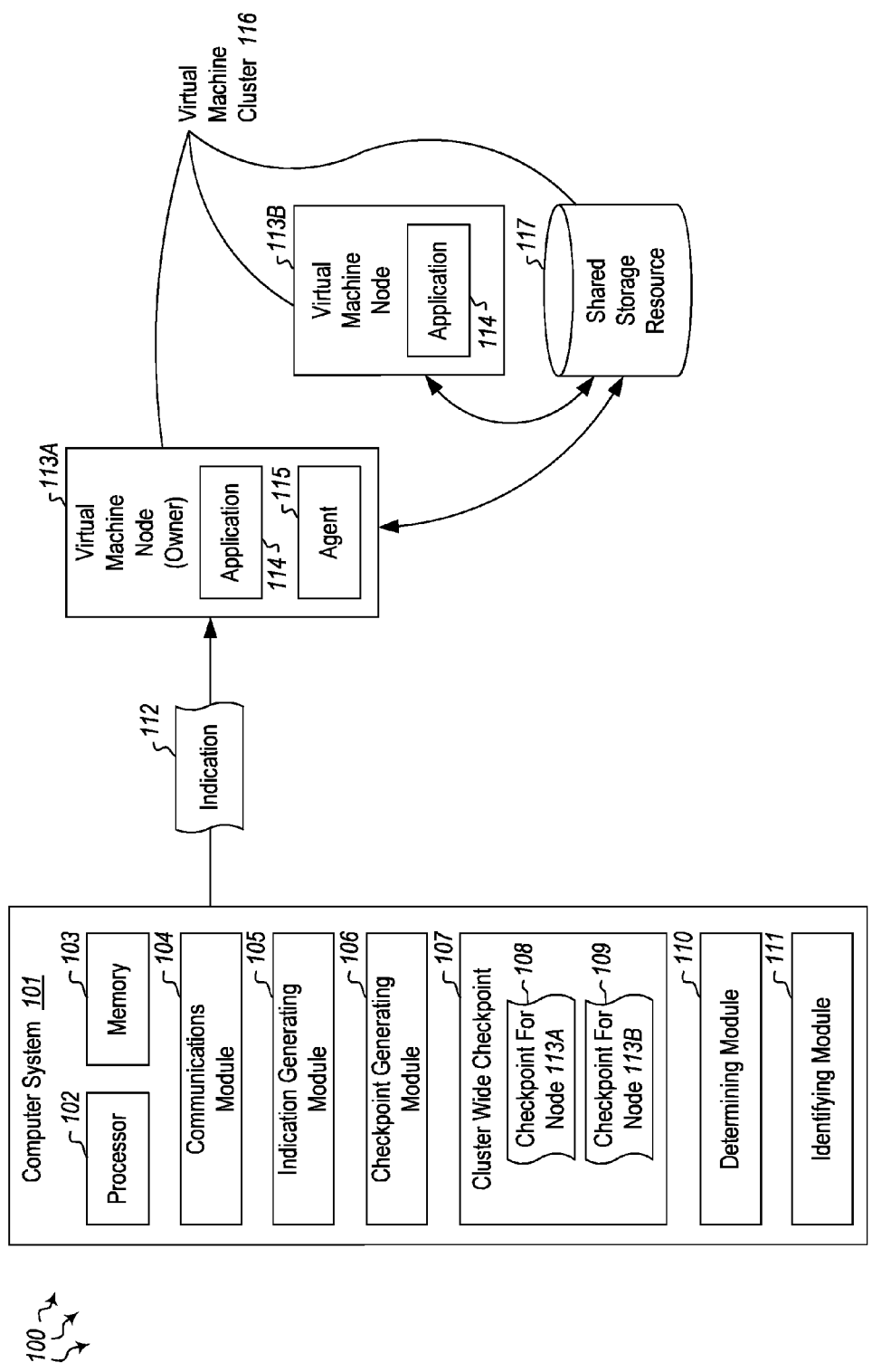
FIG. 1 illustrates a computer architecture in which embodiments described herein may operate including backing up a virtual machine cluster.

Embodiments described herein are directed to backing up a virtual machine cluster and to determining virtual machine node ownership prior to backing up a virtual machine cluster. In one embodiment, a computer system determines which virtual machines nodes are part of the virtual machine cluster, determines which shared storage resources are part of the virtual machine cluster and determines which virtual machine nodes own the shared storage resources. The computer system then indicates to the virtual machine node owners that at least one specified application is to be quiesced over the nodes of the virtual machine cluster, such that a consistent, cluster-wide checkpoint can be created. The computer system further creates a cluster-wide checkpoint which includes a checkpoint for each virtual machine in the virtual machine cluster.

In another embodiment, a computer system performs a method for determining virtual machine node ownership prior to backing up a virtual machine cluster. The computer system determines that ownership has changed for at least one shared storage resource within a virtual machine cluster and identifies at least one potential new owner of the shared storage resource. The computer system determines which virtual machine nodes own the shared storage resources and indicates to the virtual machine node owners that at least one specified application is to be quiesced over the nodes of the virtual machine cluster, so that a consistent, cluster-wide checkpoint can be created. The computer system then creates the cluster-wide virtual machine checkpoint which includes checkpoints for each shared storage device in the virtual machine cluster.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The computer system 101 may include a checkpoint generating module 106. The checkpoint generating module 106 may be configured to generate checkpoints or snapshots. These checkpoints or snapshots are point-in-time representations of the state of a computing system. These checkpoints may form points of reference for restoring a computing system to a prior state in time. The checkpoint may include an operating system, applications that are installed within that operating system, data files, settings and configuration changes, media files and other data related to a physical or virtual machine node. In some cases, the checkpoint may be a cluster-wide checkpoint that applies to multiple different virtual machine nodes and/or shared storage resources within a virtual machine cluster.

For example, as shown in FIG. 1, virtual machine cluster 116 includes two virtual machine (VM) nodes 113A and 113B. Although two nodes are shown in FIG. 1, it will be understood that substantially any number of VM nodes may be in a given VM cluster. Similarly, while only one shared storage resource 117 is shown in FIG. 1, it will be understood that substantially any number of shared storage resources may be implemented in a given VM cluster or cluster of physical machines. Each virtual machine node may have applications installed on it, such as application 114. As shown in FIG. 1, the VM nodes may have the same application (e.g. 114) installed, and may have other applications installed which are not shown. Indeed, each VM node may have substantially any number of applications or services installed or running on it. Virtual machine nodes may further have virtualization agents (or simply "agents" herein) installed on them. These agents (e.g. 115) may perform multiple tasks including preparing VM nodes to generate a cluster-wide checkpoint.

For instance, the indication generating module 105 may generate indication 112 which is sent to one or more nodes of the virtual machine cluster 116. In FIG. 1, the indication 112 is sent to VM node 113A which is the owner of the shared storage resource 117 which is shared between VM nodes 113A and 113B. The indication may indicate to the owning VM node that an application (e.g. 114) is to be quiesced over the VM nodes of the cluster and over the shared storage 117. The term "quiescing" as used herein refers to settling an application, or preparing the application so that a consistent, stable checkpoint can be created for the application. As such, quiescing may include writing data to the shared storage, flushing data from temporary memory, completing transactions, or taking any other steps needed to obtain a stable state for that application or set of applications. Once an application is quiesced over the shared storage, a stable, consistent checkpoint may be generated that applies to multiple VM nodes and potentially multiple shared storage resources within a VM cluster.

Virtual machines are often clustered using high availability software running inside guest operating systems. These guest operating systems may use various forms of shared storage including shared virtual hard disks. Traditional virtual machine backups only work with a single VM at a time and do not provide a means for backing up an entire VM cluster in a consistent way. As such, backing up a single VM at a time does not provide a coherent image of the entire cluster. Moreover, backing up each virtual machine separately may result in multiple copies of the shared storage being backed up, resulting in wasted storage resources.

Figure 4:
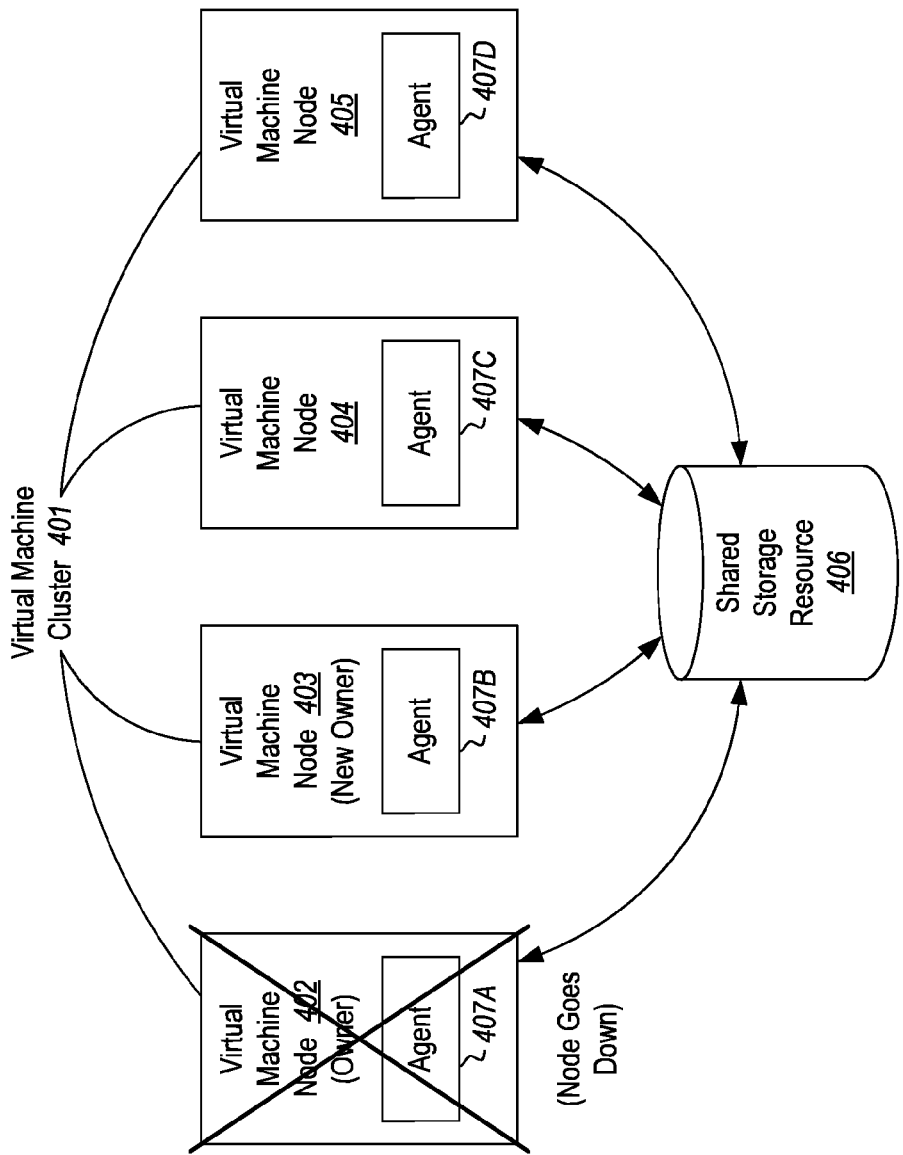
FIG. 4 illustrates an embodiment in which a virtual machine node within a virtual machine cluster goes down and ownership changes nodes.

The VM cluster (also referred to herein as a guest cluster) 116 may include multiple VM nodes spread across multiple physical servers, which themselves may be part of a host cluster. As mentioned above, a virtualization agent may be instantiated in each VM. The virtualization agent may include integration components installed within the virtual machine. The virtualization agent may query the clustering framework in the guest operating system to determine the shared storage resources and the owning nodes of the shared storage resources. Typically, in a VM cluster, a shared disk or other shared storage resource is exclusively owned by one VM node (e.g. node 113A in FIG. 1). In some embodiments, this may be achieved by using small computer system interface (SCSI) reservation. Only the owning node can perform I/O to the shared disk. On the event of a failover, the ownership moves over to another VM node (as generally shown in FIG. 4).

At the host cluster level, a snapshot operation may be initiated on a VM cluster as a whole. At the host cluster layer, messages are sent to the virtualization agents inside the VMs (that are members of the VM cluster) querying about shared storage information. Each VM's virtualization agent queries the in-guest clustering framework (e.g. high availability software) to obtain the list of shared disk resources in the cluster and the owning nodes of each of them. This information is then sent back to the host cluster. The communication with the virtualization agent can take place through a secure, private guest-host communication channel (e.g. over a VM bus) or through other communication means.

Figure 5:
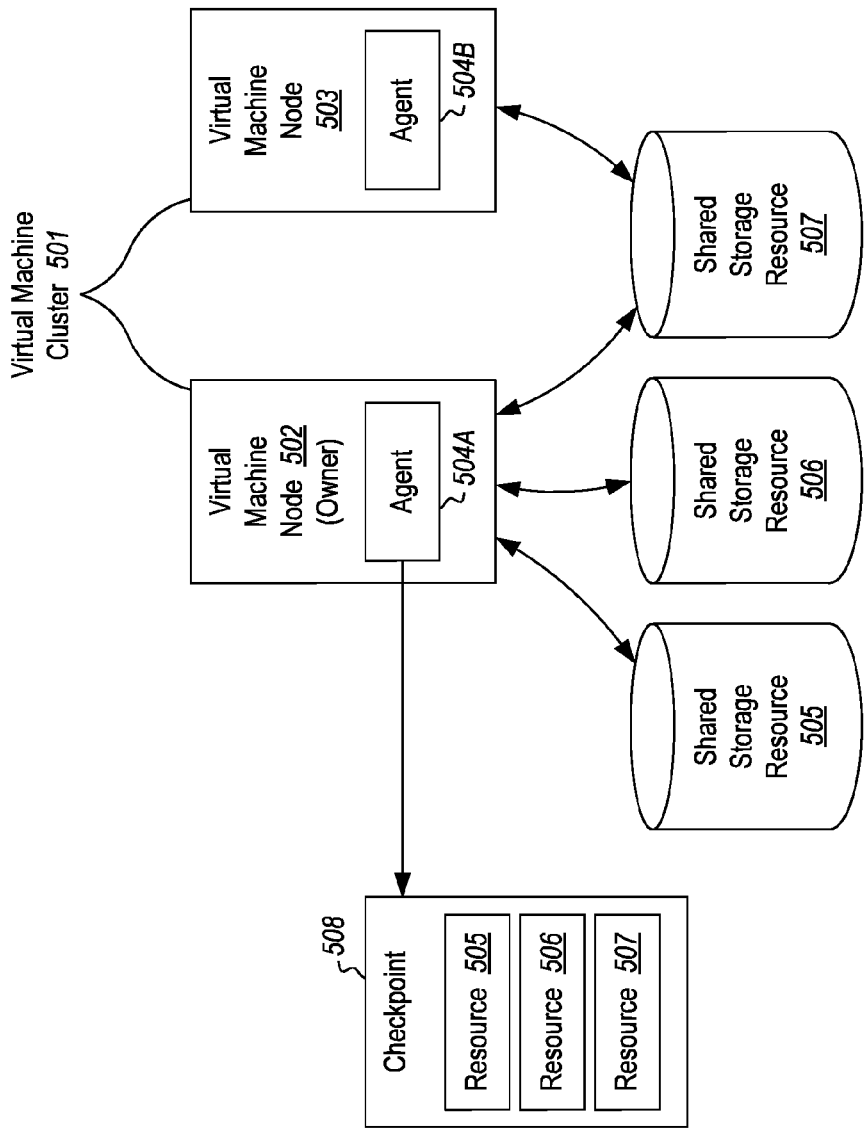
FIG. 5 illustrates an embodiment in which an agent instantiated in a virtual machine node creates a checkpoint for multiple shared storage resources.

The host cluster may use the information obtained from the virtualization agents to ensure that only the owning VM of a shared disk should take responsibility to take snapshot of that shared virtual disk (e.g. 117). The host cluster initiates VM snapshot operations for each VM in the guest cluster. Additionally, the host cluster provides each VM a list of shared virtual disks it is responsible for snapshotting. At least in some embodiments, the owning VM is also responsible to get the applications running on the shared virtual disk to a consistent state (i.e. quiescing the applications) before performing the snapshot of the storage. Each VM may also be responsible for taking snapshot of its private/non-shared storage. The result is a snapshot of the entire guest/VM cluster which includes snapshots of each VM, but there is a single instance of each shared virtual disk in the snapshot (as generally shown in FIG. 5).

Accordingly, embodiments described herein include instantiating an agent in each VM which provides information about shared storage resources. Furthermore, embodiments analyze this information about shared storage resources at the host cluster level to distribute responsibility of snapshotting the shared storage devices across different VMs. These concepts will be explained further below with regard to methods 200 and 300 of FIGS. 2 and 3, respectively.

Figure 2:
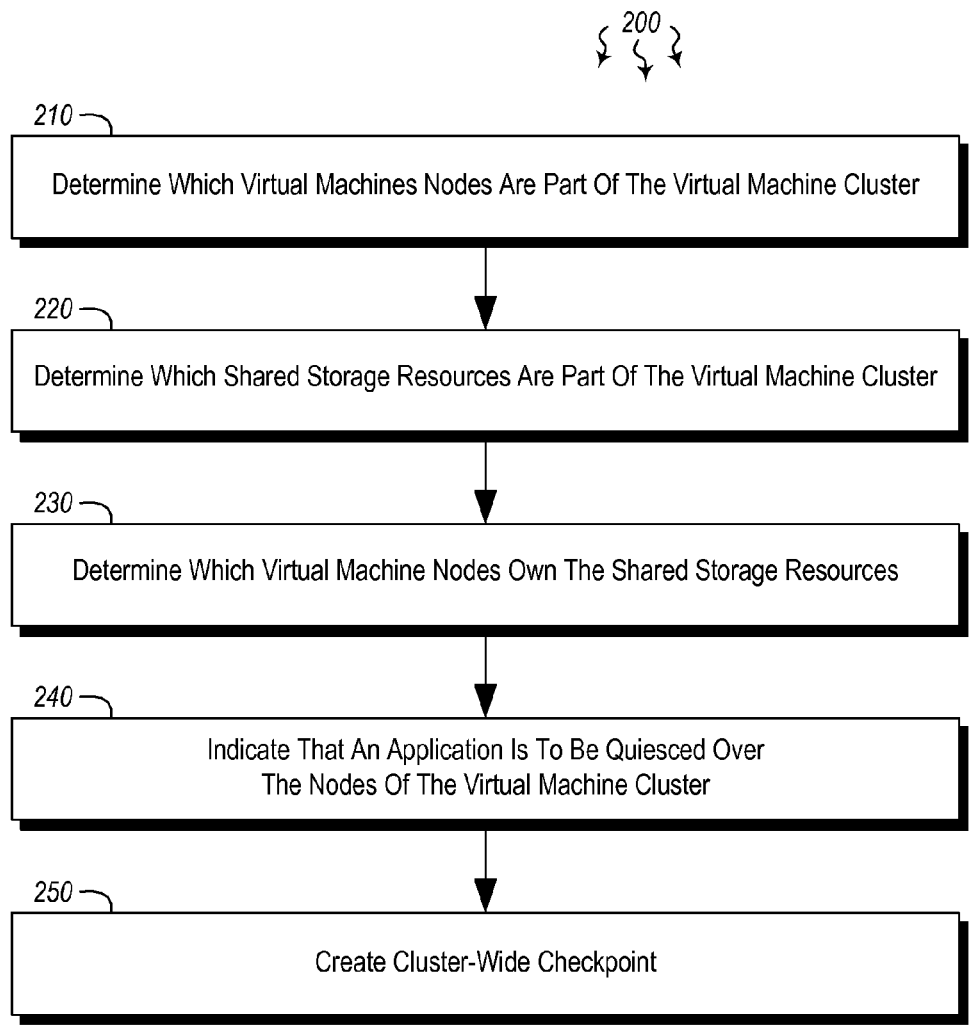
FIG. 2 illustrates a flowchart of an example method for backing up a virtual machine cluster.
Figure 3:
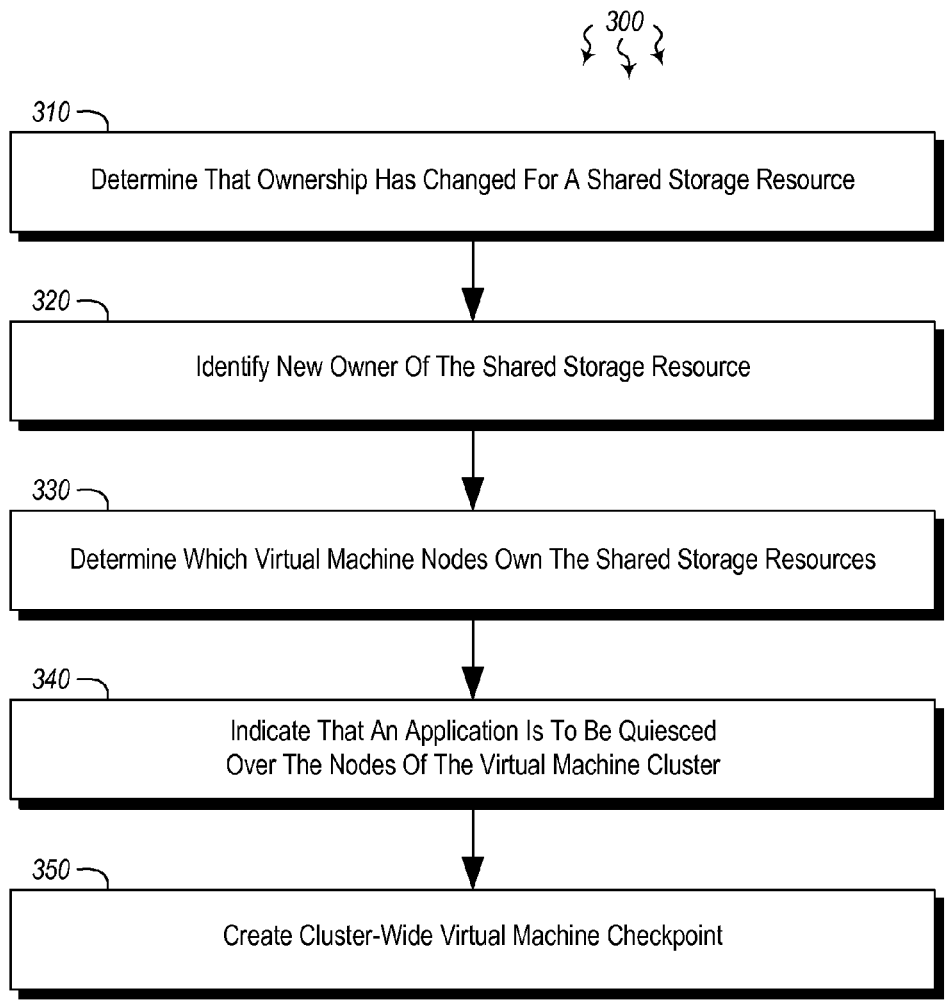
FIG. 3 illustrates a flowchart of an example method for determining virtual machine node ownership prior to backing up a virtual machine cluster.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for backing up a virtual machine cluster. The method 200 will now be described with frequent reference to the components and data of environment 100.

Method 200 includes determining which virtual machines nodes are part of the virtual machine cluster (210). For example, determining module 110 of computer system 101 may determine that virtual machine nodes 113A and 113B are part of VM cluster 116. The determining module 110 may also determine which shared storage resources are part of the virtual machine cluster (220), and which virtual machine nodes own the shared storage resources (230). Thus, in FIG. 1, the determining module may query the VM nodes or the agents instantiated on those nodes to determine that shared storage resource 117 is part of the VM cluster 116, and further that VM node 113A is the owner of the shared storage resource 117. As such, VM node 113A has the exclusive ability among the VM nodes to write to the shared storage resource 117. By only allowing one VM node in a cluster to be an owner, data consistency can be ensured among multiple different VM nodes that are accessing the shared storage resource. In some cases, multiple VM nodes may read data from the shared storage resource simultaneously, whereas in other cases, only one node can read or write to the shared storage resource at a time. Still further, applications may be running on each shared storage resource, as well as running on the resource owner node.

Method 200 further includes indicating to the one or more virtual machine nodes that are storage device owners that at least one specified application is to be quiesced over the nodes of the virtual machine cluster, such that a consistent, cluster-wide checkpoint can be created (240). For example, the indication generating module 105 may generate indication 112 and the communications module 104 may communicate the indication to VM nodes that are storage device owners of various VM clusters. In cases where the computer system 101 is a host machine to one or more VM nodes, the communication may occur over a VM bus, over a simulated local network connection, or via other communication means. If the VM nodes are being hosted on a physical computing system that is different from computer system 101, the indication message 112 may be transmitted via any wired or wireless communication means. The indication indicates that data is to be quiesced for an operating system, for an application, for a service, or for some combination thereof.

For example, if a cluster-wide checkpoint is to be created for application 114 which is running on both VM nodes 113A and 113B, the indication 112 would indicate that the data for application 114 is to be quiesced so that a consistent, stable checkpoint can be generated for that application. It should be noted that, in another embodiment, the checkpoint generation module 106 may be the one to issue the indication 112 that the data for application 114 is to be quiesced. The checkpoint generation module 106 may ask each VM node to quiesce and generate a checkpoint. In response to this message/indication, each VM node quiesces the application and creates the checkpoint of the storage (including the shared storage it owns). The resulting cluster-wide checkpoint 107 would include a checkpoint 108 for VM node 113A and a checkpoint 109 for VM node 113B.

Once the data for the application has been quiesced, the checkpoint generating module 106 may generate a cluster-wide checkpoint which includes a checkpoint for each virtual machine in the virtual machine cluster (250). The cluster-wide checkpoint 107 may thus include a single instance of each shared storage resource in the virtual machine cluster. Accordingly, if a virtual machine cluster included multiple different shared storage resources, the cluster-wide checkpoint would include a checkpoint for each shared storage resource in that cluster.

For example, as illustrated in FIG. 5, virtual machine cluster 501 includes two virtual machine nodes 502 and 503 and three shared storage resources (e.g. virtual or physical hard disks or other types of storage media) 505, 506 and 507. When the checkpoint generating module 106 generates a cluster-wide checkpoint for VM cluster 501, the cluster-wide checkpoint 508 includes separate checkpoints for each shared resource, including a checkpoint for resource 505, a checkpoint for resource 506, and a checkpoint for resource 507. The VM node 502 may be the owner for one, two or all three of the shared storage resources 505, 506 and 507. As such, VM node 502 may be responsible for quiescing data over the shared storage resources prior to generation of the cluster-wide checkpoint 508. A virtualization agent may be implemented on the VM nodes to help facilitate the creation of a consistent, stable cluster-wide checkpoint.

Each VM node may have a virtualization agent 504A/504B instantiated on it which performs various functions. For example, the virtualization agent may be configured to determine current ownership of shared storage resources within the virtual machine cluster. The virtualization agent 115 of FIG. 1 may take steps to determine whether the node in which it is currently instantiated is an owner and, if so, which shared storage resources it "owns." The virtualization agent 115 may also communicate with other VM nodes in the cluster 116 to determine whether they are owners and which shared storage resources they own. Alternatively, agents may be used to broadcast messages to other VM nodes in the cluster notifying those nodes of current ownership status of each node within the cluster. In other embodiments, a combination of push and pull techniques may be used to determine shared storage ownership within the VM cluster.

In some embodiments, the virtualization agent 115 may communicate with a host operating system to make various determinations including VM cluster membership and ownership within the cluster. Such communications may be made using a secure, private guest-host communication channel. In some cases, the host may indicate to the agent that a checkpoint is to be created and may specify parameters or settings for that checkpoint. For instance, the host may indicate that running processes are to be spun down immediately and that all data is to be quiesced immediately in order to take the snapshot as soon as possible. Alternatively, the host may indicate that running processes are to be spun down slowly and organically as processes naturally finish, and that data is to be quiesced upon full closure of the application and associated processes. Accordingly, an administrative or other user may have control over how the checkpoints are generated.

In a VM cluster with multiple VM nodes and multiple shared storage resources (e.g. FIG. 5), each owning VM node may create a checkpoint for the shared storage resources that it owns. Thus, if VM node 502 owns shared resources 505 and 506, it may initiate checkpoints for those resources, while if VM node 503 owns shared resource 507, it may initiate a checkpoint for that resource. The cluster-wide checkpoint 508 in that case would include separate checkpoints for each shared resource (505, 506 and 507), where each shared storage resource's checkpoint was initiated by that resource's owner. This may take place on active-passive clusters which allow for owning nodes to quiesce applications on those nodes.

In order to maintain consistent state across applications and/or VM nodes, a shared storage resource owner may implement hard disk reservations to maintain consistent state on a shared hard disk. For example, a shared storage resource owner may implement SCSI controller reservations to maintain consistent state on a shared SCSI disk. If a non-owning virtual machine node that does not own a specified shared storage resource wishes to quiesce the data for a given application, that non-owning VM node (e.g. VM node 113B of FIG. 1) may communicate with the shared storage resource's owner (VM node 113A) to quiesce a given application. The owning node may communicate back to the non-owning node to indicate that the application's data has been quiesced upon completion. In some cases, a virtual machine node's guest operating system may be the entity that initiates the creation of a checkpoint for the virtual machine node. In these cases, the guest OS can communicate with the agent on the VM node to initiate the creation of a checkpoint.

In some cases, the virtual machine nodes may have their own private, non-shared storage resources. In such cases, the virtual machine node having its own private, non-shared storage resource may create a checkpoint for its private, non-shared storage. This private checkpoint may be stored along with the other shared resource checkpoints of the cluster-wide checkpoint 508, or may be stored separately.

The agents may further be used to analyze other virtual machine nodes in the virtual machine cluster to determine whether the virtual machine nodes have experienced failure. And, upon determining that a virtual machine node has failed, the agent may initiate an analysis to determine whether the virtual machine node's failure has affected shared storage node ownership within the virtual machine cluster. For example, as shown in FIG. 4, virtual machine cluster 401 may include four virtual machine nodes: 402, 403, 404 and 405. Each VM node may include its own agent: 407A, 407B, 407C and 407D, respectively. Each of the VM nodes of the cluster 401 may access a single shared storage resource 406. If, as shown in FIG. 4, VM node 402 is the owner of the shared storage resource 406, and if the node goes down for some reason (e.g. due to hardware or software failure), ownership may be moved to another virtual machine node within the virtual machine cluster 401. The new owner may be any other VM node in the cluster, and may be determined based on policy or simply based on a "next-available" approach. Upon assuming the owner role, VM 403 is now the owner of shared storage resource 406 and is the sole controller of data writes to that storage resource.

Turning now to FIG. 3, a flowchart is illustrated of a method 300 for determining virtual machine node ownership prior to backing up a virtual machine cluster. The method 300 will now be described with frequent reference to the components and data of environment 100 of FIG. 1.

Method 300 includes determining that ownership has changed for at least one shared storage resource within a virtual machine cluster (310). For instance, as mentioned above with regard to FIG. 4, ownership of a shared storage resource may change over time. For example, a VM node that owns a particular resource may go down due to hardware or software failure, due to routine maintenance, due to a malicious attack or for some other reason. In some cases, however, ownership may change based on policy or based on a manual change made by a user, and not due to any type of failure on the VM node. For instance, an administrator or other user may wish to change ownership from VM node 402 to VM node 403 in FIG. 4. The administrator may have various reasons for doing so. Indeed, the administrator may know that a given node is going to be brought down for maintenance within the next twenty-four hours. As such, the administrator may transfer the ownership to another VM node within the cluster.

In some cases, a failover policy may be in place between VM nodes in the cluster. For example, VM cluster 401 of FIG. 4 may have instituted a failover policy that indicates that upon failure of a given node, the ownership role and perhaps application processing for some applications may automatically fail over to a specified VM node. Thus, in VM cluster 401, a failover policy may indicate that if VM node 402 goes down, then the owner role is to be transferred to VM node 403. The failover policy may further indicate that if VM node 403 goes down, then the owner role is to be transferred to VM node 404, and so on.

Method 300 next includes identifying at least one potential new owner of the shared storage resource (320). The identifying module 111 of computer system 101 of FIG. 1 may identify potential new owners of the shared storage resource. In the example above where the ownership role was transferred according to failover policy, the identifying module 111 or any of the virtualization agents installed on the VM nodes may determine which VM nodes may be potential new owners of a given shared storage resource. As there may be many shared storage resources within a VM cluster, there may be many owners and many potential owners. For instance, a policy may indicate who the subsequent owner will be if the node fails for some reason. As such, agents may communicate with each other to maintain a current state of ownership for each storage resource that identifies who the current owner is, and identifies potential new owners based on policy.

Method 300 further includes determining which one or more virtual machine nodes own the shared storage resources (330). For example, the determining module 110 may determine that VM node 113A of FIG. 1 currently owns shared storage resource 117. The indication generating module 105 may then generate indication 112 which indicates to the one or more virtual machine nodes that are owners of shared storage resources that at least one specified application is to be quiesced over the nodes of the virtual machine cluster, such that a consistent, cluster-wide checkpoint can be created (340). The cluster-wide checkpoint generating module 106 may then generate the cluster-wide virtual machine checkpoint 107 (350) which includes checkpoints for each shared storage device in the virtual machine cluster (including checkpoints for VM node 113A (checkpoint 108) and for VM node 113B (checkpoint 109)). The cluster-wide checkpoint generating module 106 may, at least in some embodiments, generate the indication 112 which quiesces specified applications and creates checkpoints in a single step.

As mentioned above, a change in ownership may result in many different scenarios including failover from a failed VM node or manual changing of ownership by an administrator. Because the owner role ensures that only one VM node can write to a shared storage device, if that owner role fails and does not failover, no VM nodes will be able to write that shared storage device. As such, the ownership role transfers from node to node as needed to ensure that each shared storage resource has an owner. The shared storage resource owner has exclusive write access to the shared storage resource, or may have shared write access to the shared storage resource wherein access is regulated according to an access policy. For example, if two different VM nodes are writing to different files on a shared data store, both nodes may have ownership and write to the shared storage device simultaneously.

In some embodiments, the shared storage resource is part of a host computing node (such as computer system 101 of FIG. 1) or may be accessed through the host computing node. The shared storage resource may be accessed using a virtualization agent installed on the VM node. The virtualization agents may be instantiated on each virtual machine node, and the virtualization agent may be configured to determine shared storage resource ownership and ensure consistency among checkpoints. Consistency may be ensured by quiescing application data to disk prior to creating a checkpoint. VM nodes that are owners may quiesce application data when instructed or automatically when needed. Additionally, non-owning virtual machine nodes may determine the current owner for a given shared storage resource and allow the current owner to quiesce application running on the non-owning virtual machine node.

A computer system that includes at least one processor performs a computer-implemented method for backing up a virtual machine cluster, the method comprising: determining which virtual machines nodes 113A are part of the virtual machine cluster 116, determining which shared storage resources 117 are part of the virtual machine cluster, determining which one or more virtual machine nodes own the shared storage resources, indicating to the one or more virtual machine node owners 113A that at least one specified application 114 is to be quiesced over the nodes of the virtual machine cluster, such that a consistent, cluster-wide checkpoint 107 can be created, and creating a cluster-wide checkpoint 107 which includes a checkpoint for each virtual machine in the virtual machine cluster.

In some embodiments, the cluster-wide checkpoint includes a single instance of each shared storage resource in the virtual machine cluster. The virtualization agent is instantiated on each virtual machine, and the virtualization agent determines current ownership of shared storage resources within the virtual machine cluster. The virtualization agent also communicates with a host operating system using a secure, private guest-host communication channel.

A computer system is provided which includes at least one processor. The computer system performs a computer-implemented method for determining virtual machine node ownership prior to backing up a virtual machine cluster, the method comprising: determining that ownership has changed for at least one shared storage resource 406 within a virtual machine cluster 401, identifying at least one potential new owner 403 of the shared storage resource, determining which one or more virtual machine nodes 403 own the shared storage resources, indicating to the one or more virtual machine node owners that at least one specified application 114 is to be quiesced over the nodes of the virtual machine cluster 401, such that a consistent, cluster-wide checkpoint 107 can be created and creating the cluster-wide virtual machine checkpoint 107 which includes checkpoints for each shared storage device 406 in the virtual machine cluster.

In some embodiments, the shared storage resource owner has exclusive access to the shared storage resource, or has shared access to the shared storage resource wherein access is regulated according to an access policy. In some cases, the virtualization agent is instantiated on each virtual machine, where the virtualization agent is configured to determine shared storage resource ownership and ensure consistency among checkpoints. A non-owning virtual machine node determines the current owner for a given shared storage resource and allows the current owner to quiesce one or more applications running on the non-owning virtual machine node.

A computer system is provided that includes the following: one or more processors, a determining module 110 for determining which virtual machines nodes 113A are part of the virtual machine cluster 116, determining which shared storage resources are part of the virtual machine cluster, and determining which one or more virtual machine nodes own the shared storage resources, an indicating module 105 for indicating to the one or more virtual machine node owners that at least one specified application 114 is to be quiesced over the nodes of the virtual machine cluster 116, such that a consistent, cluster-wide checkpoint 107 can be created, and a cluster-wide checkpoint creating module 106 for creating the cluster-wide checkpoint 107 which includes a checkpoint for each virtual machine in the virtual machine cluster 116.

The computer system further includes an analyzing module for analyzing one or more virtual machine nodes in the virtual machine cluster to determine whether the virtual machine nodes have experienced failure and, upon determining that at least one virtual machine node has failed, initiating an analysis to determine whether the virtual machine node's failure has affected shared storage node ownership within the virtual machine cluster. Upon failover due to node failure, ownership of a shared storage resource is moved to another virtual machine node within the virtual machine cluster. The owning virtual machine node of a shared storage resource quiesces one or more applications running on the shared storage resource and creates a checkpoint for that shared storage resource.

In some embodiments, the owning virtual machine node owns a plurality of shared storage resources, and creates checkpoints for each of the plurality of shared storage resources that it owns. In some cases, at least one of the virtual machine nodes has its own private, non-shared storage resource, and further, the at least one virtual machine node has its own private, non-shared storage resource creates a checkpoint for its private, non-shared storage. A non-owning virtual machine node that does not own a specified shared storage resource communicates with the shared storage resource's owner to quiesce a given application.

Accordingly, methods, systems and computer program products are provided which back up a virtual machine cluster. Moreover, methods, systems and computer program products are provided which determining virtual machine node ownership prior to backing up a virtual machine cluster.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computer system including at least one processor, a computer-implemented method for backing up a virtual machine cluster, the method comprising:
   determining a plurality of virtual machine nodes that are part of the virtual machine cluster;
   determining one or more shared storage resources that are part of the virtual machine cluster;
   determining which of the virtual machine nodes owns each of the shared storage resources;
   indicating to each of the virtual machine nodes that is an owner of a shared storage resource that at least one specified application is to be quiesced over the nodes of the virtual machine cluster, such that a consistent, cluster-wide checkpoint can be created; and
   initiating the creation of a cluster-wide checkpoint which includes a checkpoint for each virtual machine node in the virtual machine cluster, wherein the cluster-wide checkpoint includes at least one instance of each shared storage resource in the virtual machine cluster.

2. The method of claim 1, wherein a virtualization agent is instantiated on each virtual machine.

3. The method of claim 2, wherein the virtualization agent determines current ownership of shared storage resources within the virtual machine cluster.

4. The method of claim 2, wherein the virtualization agent communicates with a host operating system using a secure, private guest-host communication channel.

5. The method of claim 1, wherein upon failover due to node failure, ownership of a shared storage resource is moved to another virtual machine node within the virtual machine cluster.

6. The method of claim 1, wherein the owning virtual machine node of a shared storage resource quiesces one or more applications running on the shared storage resource and creates a checkpoint for that shared storage resource.

7. The method of claim 6, wherein the owning virtual machine node owns a plurality of shared storage resources, and creates checkpoints for each of the plurality of shared storage resources that it owns.

8. The method of claim 1, wherein at least one of the virtual machine nodes has its own private, non-shared storage resource, and wherein the at least one virtual machine node having its own private, non-shared storage resource creates a checkpoint for its private, non-shared storage.

9. The method of claim 1, wherein a non-owning virtual machine node that does not own a specified shared storage resource communicates with the shared storage resource's owner to quiesce a given application.

10. The method of claim 1, wherein a shared storage resource owner implements hard disk reservations to maintain consistent state on a shared hard disk.

11. At a computer system including at least one processor, a computer-implemented method for determining virtual machine node ownership prior to backing up a virtual machine cluster, the method comprising:
    determining that ownership has changed for at least one shared storage resource within a virtual machine cluster;
    identifying at least one potential new owner of the at least one shared storage resource;
    determining which of the one or more virtual machine nodes owns each shared storage resource within the virtual machine cluster;
    indicating to each of the virtual machine nodes that is an owner of a shared storage resource that at least one specified application is to be quiesced over the nodes of the virtual machine cluster, such that a consistent, cluster-wide checkpoint can be created; and
    initiating the creation of the cluster-wide virtual machine checkpoint which includes checkpoints for each shared storage resource in the virtual machine cluster, wherein the cluster-wide checkpoint includes at least one instance of each shared storage resource in the virtual machine cluster.

12. The method of claim 11, wherein the change in ownership results from failover due to failure of a previous shared storage resource owner.

13. The method of claim 11, wherein the shared storage resource owner has exclusive access to the shared storage resource, or has shared access to the shared storage resource wherein access is regulated according to an access policy.

14. The method of claim 11, wherein the shared storage resource is part of a host computing node or is accessed through the host computing node.

15. The method of claim 11, wherein a virtualization agent is instantiated on each virtual machine, the virtualization agent being configured to determine shared storage resource ownership and ensure consistency among checkpoints.

16. The method of claim 11, wherein a non-owning virtual machine node determines the current owner for a given shared storage resource and allows the current owner to quiesce one or more applications running on the non-owning virtual machine node.

17. A computer system comprising the following:
    one or more processors; and
    one or more computer-readable storage media having stored thereon computer-executable instructions that are executable by the one or more processors to cause the computer system to back up a virtual machine cluster, the computer-executable instructions including instructions that are executable by the one or more processors to cause the computer system to perform at least the following:
    determine a plurality of virtual machine nodes that are part of the virtual machine cluster;
    determine one or more shared storage resources that are part of the virtual machine cluster;
    determine which of the virtual machine nodes owns each of the shared storage resources;
    indicate to each of the virtual machine nodes that is an owner of a shared storage resource that at least one specified application is to be quiesced over the nodes of the virtual machine cluster, such that a consistent, cluster-wide checkpoint can be created; and initiate the creation of the cluster-wide checkpoint which includes a checkpoint for each virtual machine in the virtual machine cluster, wherein the cluster-wide checkpoint includes at least one single instance of each shared storage resource in the virtual machine cluster.

18. The computer system of claim 17, wherein a virtual machine node's guest operating system initiates the creation of a checkpoint for the virtual machine node.

19. The computer system of claim 18, the computer-executable instructions also including instructions that are executable by the one or more processors to cause the computer system to analyze one or more virtual machine nodes in the virtual machine cluster to determine whether the virtual machine nodes have experienced failure and, upon determining that at least one virtual machine node has failed, initiate an analysis to determine whether the virtual machine node's failure has affected shared storage node ownership within the virtual machine cluster.

* * * * *